Aug. 28, 1956 E. O. EASON 2,760,618
AUTOMATIC COIN CONTROLLED LIQUID DISPENSING DEVICE
Filed Sept. 16, 1949 7 Sheets-Sheet 1

Ernest O. Eason,
INVENTOR.

BY Martin E Anderson
ATTORNEY.

Aug. 28, 1956     E. O. EASON     2,760,618
AUTOMATIC COIN CONTROLLED LIQUID DISPENSING DEVICE
Filed Sept. 16, 1949     7 Sheets-Sheet 2

Ernest O. Eason,
INVENTOR.

BY *Martin E. Anderson*
ATTORNEY

Aug. 28, 1956 E. O. EASON 2,760,618
AUTOMATIC COIN CONTROLLED LIQUID DISPENSING DEVICE
Filed Sept. 16, 1949 7 Sheets-Sheet 3

Ernest O. Eason,
INVENTOR.

BY Martin E Anderson
ATTORNEY.

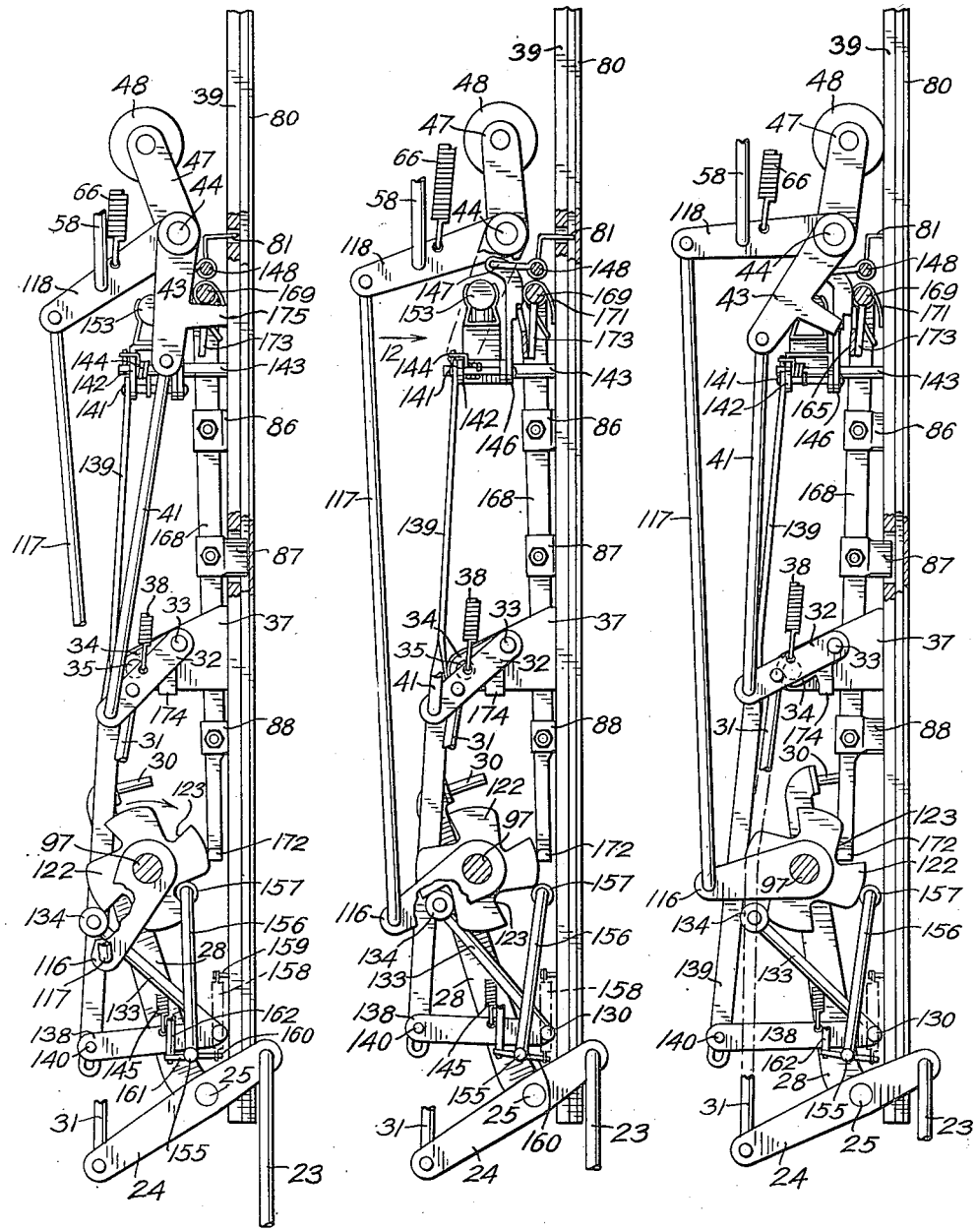

Aug. 28, 1956 E. O. EASON 2,760,618
AUTOMATIC COIN CONTROLLED LIQUID DISPENSING DEVICE
Filed Sept. 16, 1949 7 Sheets-Sheet 5
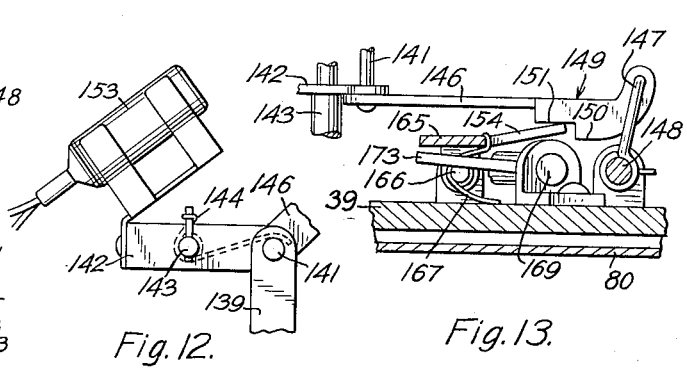
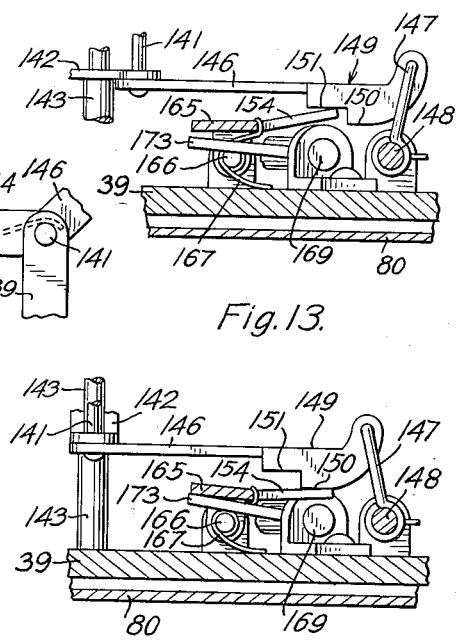
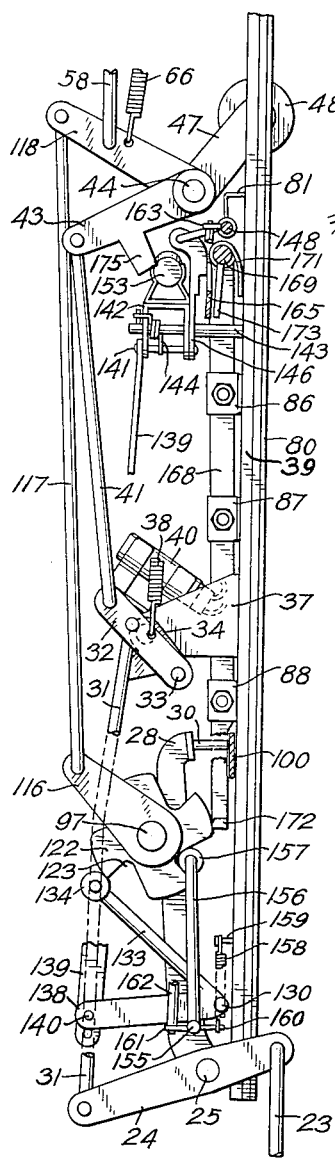
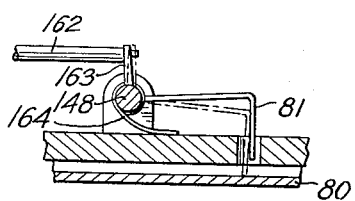
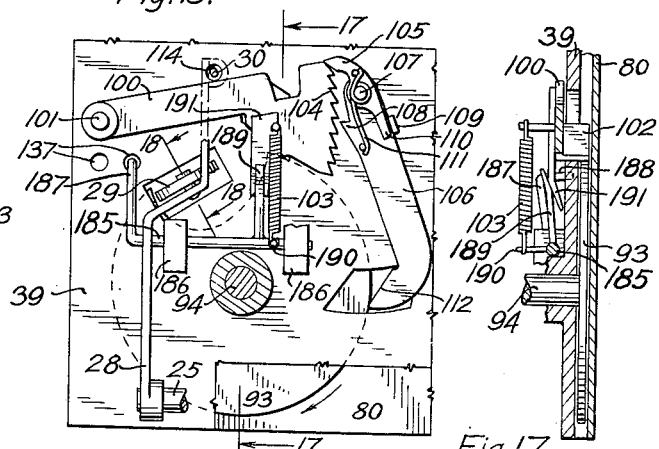
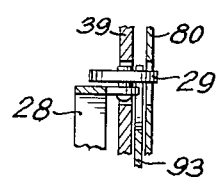
Ernest O. Eason,
INVENTOR.
BY Martin E. Anderson
ATTORNEY Aug. 28, 1956  E. O. EASON  2,760,618
AUTOMATIC COIN CONTROLLED LIQUID DISPENSING DEVICE
Filed Sept. 16, 1949  7 Sheets-Sheet 6

*Ernest O. Eason,*
INVENTOR.

BY *Martin E. Anderson*
ATTORNEY

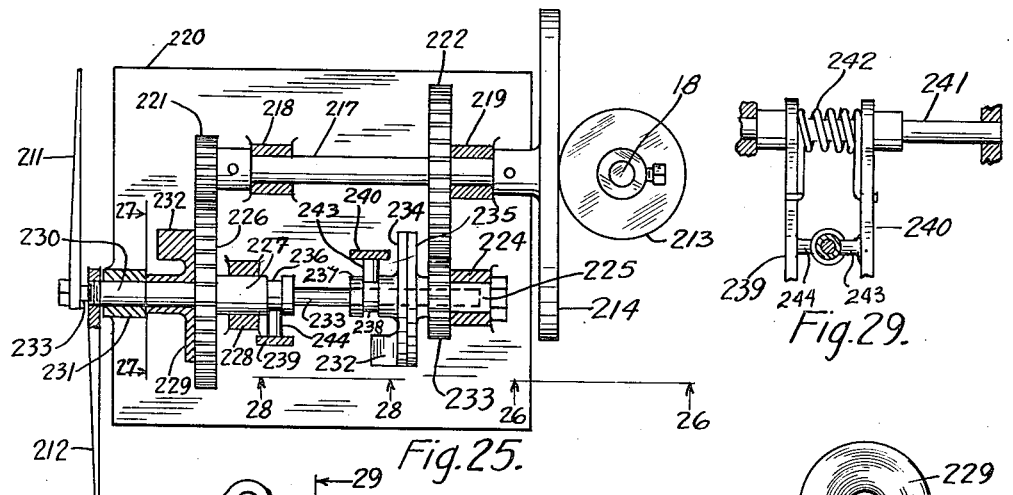

United States Patent Office 2,760,618
Patented Aug. 28, 1956

2,760,618

AUTOMATIC COIN CONTROLLED LIQUID DISPENSING DEVICE

Ernest O. Eason, Wheatridge, Colo.

Application September 16, 1949, Serial No. 116,166

11 Claims. (Cl. 194—13)

This invention relates to improvements in coin controlled liquid dispensing apparatus and has reference more particularly to an automatic coin controlled apparatus for dispensing gasoline.

The large number of filling stations and the small margin between cost and selling price naturally limits the average profits with the result that economies must be practiced, at least at the smaller station.

It is the object of this invention to produce an automatic gasoline dispensing apparatus which employs a pressure operated meter and which is coin controlled so as to dispense unit quantities of gasoline, each of which has the value of twenty-five cents, this unit being selected because fifty cents and one dollar coins are both multiples thereof.

Another object is to produce a dispensing apparatus which, aside from the fact that it is coin controlled, can be operated in the same manner as ordinary metering dispensing devices, that is, after the apparatus has been started to operate, no gasoline will flow until the valve in the dispensing hose nozzle is opened and this may be closed and opened as often as necessary, so as to permit the nozzle to be shifted from one container to another, as occasion may require.

Another object is to produce a gasoline dispensing apparatus provided with means for positively latching the meter when the quantity bought has been dispensed so as to prevent it from moving in response to the momentum of its moving parts.

Another object is to produce a dispensing apparatus having means for subjecting all coins inserted therein to three tests: namely, for size, resiliency and electrical conductivity, the testing device being an adaptation of that described and claimed in United States Patent No. 2,148,-291, granted to me on February 21, 1939.

A further object is to provide a dispensing apparatus of the foregoing type in which operation may be effected by a manual control in lieu of the coin control.

A further object is to provide the apparatus with a registering mechanism which indicates the quantity of fuel purchased.

A further object is to produce a mechanism that can be manufactured as a unitary assembly which can be installed and removed as a unit so as to facilitate repairs, or which can be quickly replaced by another in case of breakage.

A still further object is to produce a coin controlled mechanism in which a number of coins of different denominations can be inserted at one time and which will test such coins separately and deliver them to a meter control device in which each coin serves to dispense a quantity of gasoline of its own value.

The above and other objects that may become apparent as this description proceeds are attained by means of a construction and an arrangement of parts that will now be described in detail, and for this purpose reference will be had to the accompanying drawings in which the invention has been illustrated in its preferred form, and in which:

Figures 8, 9, 10 and 11 are side views similar to that shown in Figure 7, but with parts removed for the purpose of better disclosing the relationship of the parts and their position at the several steps of the operation;

Figure 12 is a fragmentary elevation showing the magnet-controlling switch in operative position;

Figure 13 is a section taken on line 13—13, Figure 6;

Figure 14 is a section similar to that shown in Figure 13, but shows the parts in another position;

Figure 15 is a section taken on line 15—15, Figure 6;

Figure 16 is a fragmentary elevational view with parts removed, showing the ratchet mechanism that controls the operation of the meter in accordance with the value of the coin employed;

Figure 17 is a section taken on line 17—17, Figure 16;

Figure 18 is a section taken on line 18—18, Figure 16, and shows the meter locking position of the blocking lever;

Figure 25 is a section taken on line 25—25, Figure 1;

Figure 26 is a section taken on line 26—26, Figure 25;

Figure 27 is a section taken on line 27—27, Figure 25;

Figure 28 is a section taken on line 28—28, Figure 25;

Figure 29 is a section taken on line 29—29, Figure 28;

Figure 30 is a side elevation of a hook and dispensing nozzle supported thereby;

Figure 31 is a fragmentary side elevation of the pump casing, a portion being broken away to illustrate certain manual control means for operating the pump; and Figure 32 is a side elevation of the pump casing taken on line 32—32, Figure 31, but with a door to the pump shown in closed position.

Figure 1:
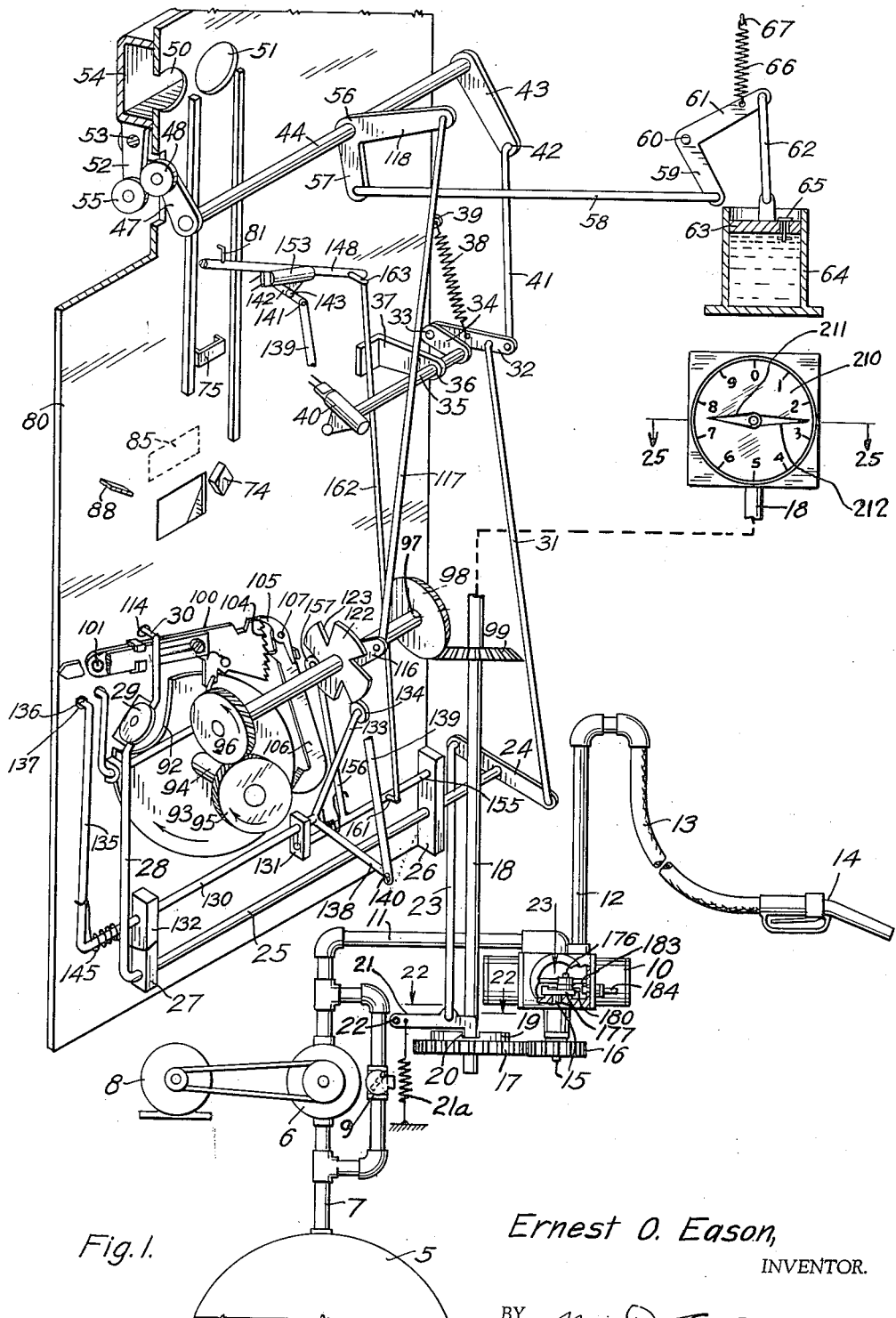
Figure 1 is a diagrammatic representation of the invention showing the various elements in operative relation.
Figure 2:
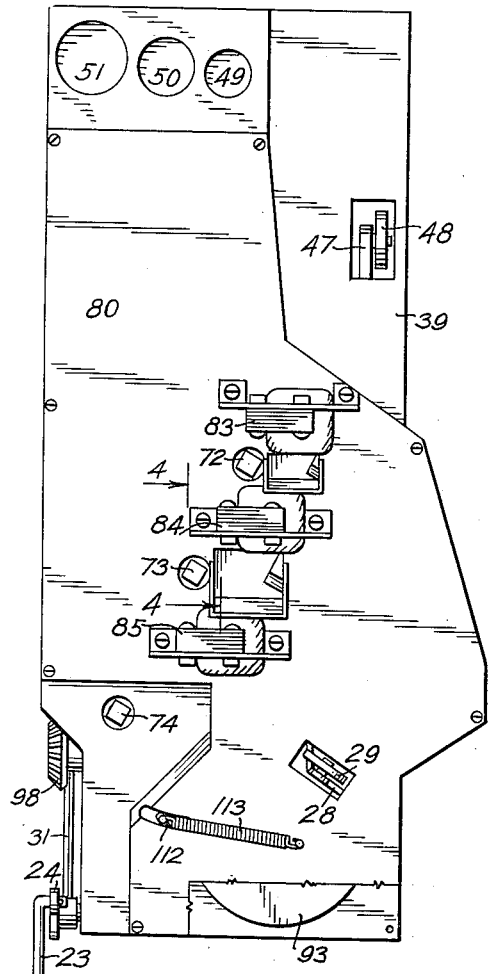
Figure 2 is an elevational view of the rear of the apparatus, looking in the direction of arrow 2 in Figure 7.

Referring now more particularly to Figure 1, reference numeral 5 designates a storage tank for gasoline or other liquid. A rotary pump 6 is connected with the storage tank by means of a suction pipe 7 and this pump is driven from an electric motor 8. A by-pass comprising a spring pressed check valve 9 connects the inlet and outlet ports of the pump and permits the liquid to circulate when the meter does not operate. The delivery or outlet port of the pump is connected with a pressure operated meter, which has been designated in its entirety by reference numeral 10, by means of a pipe 11. A delivery pipe 12 connects the outlet port of the meter with a flexible dispensing hose 13 that terminates in a valve controlled dispensing nozzle 14. Since the meter is of ordinary and usual construction, it will not be described in detail, but only such parts thereof will be described as serve a particular and novel function in connection with the apparatus comprising this invention. The meter is provided with a drive shaft 15 that is accessible from the outside and which carries a spur pinion 16 that meshes with a spur gear 17 secured to the lower end of shaft 18. In the embodiment illustrated, the pinion 16 and gear 17 have a ratio of 1 to 2, but any other ratios may be employed, if desired. Secured to the gear 17 or to the shaft 18 is a ratchet disk 19. The ratchet disk is provided with at least one notch 20 that cooperates with a latching pawl 21 that is pivoted at 22. A rod 23 is pivotally connected at its lower end with the latching pawl and at its upper end with a rocking lever 24 that is nonrotatably connected with the shaft 25 which is journaled in bearings 26, 27. The lefthand end of shaft 25, when viewed as in Figure 1, extends at right angles and forms a blocking lever 28 that carries a roller 29 which is pivotally attached to it. The upper end of the blocking lever is bent inwardly as indicated by reference numeral 30.

Pivotally secured to the outer end of rocking lever 24 is a connecting rod 31 whose upper end is pivotally connected with a floating lever 32, at a point spaced from its outer end. The inner end of lever 32 is connected with a floating pivot 33 that is carried by a crank arm 34 which, in turn, is carried by the outer end of shaft 35 that is mounted for rotation in a bearing 36 at the outer end of bracket 37. A tension spring 38 is connected with the lever 32 at a point between the pivot 33 and its pivotal connection with rod 31. This spring has its upper end anchored to the base which has been designated by reference numeral 39. Secured to the inner end of shaft 35 is a mercury switch 40 that controls the operation of the motor 8.

Figures 6, 7:
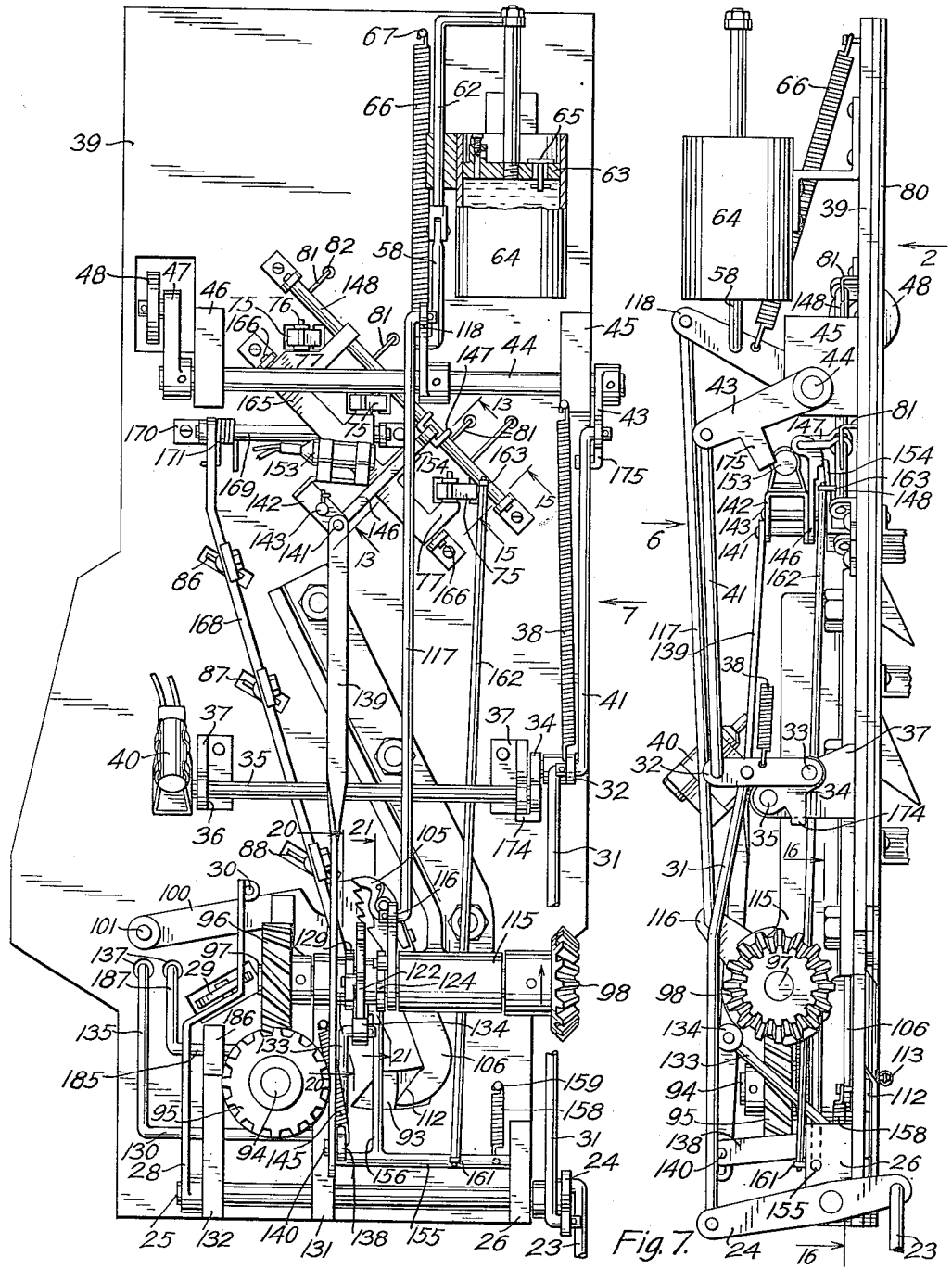
Figure 6 is an elevational view of the front side of the apparatus looking in the direction of arrow 6 in Figure 7.
Figure 7 is a side elevation looking in the direction of arrow 7, Figure 6.

The outer end of lever 32 is pivotally connected with the lower end of the rod 41 whose upper end 42 is pivotally connected with a crank arm 43 carried by shaft 44. This shaft is mounted for rotation in bearings 45 and 46 that are shown in Figure 6. The inner end of shaft 44 has a crank arm 47 to the outer end of which is pivoted a roller 48. The base plate 39 is provided with three openings 49, 50 and 51 of the proper diameter to receive silver coins of the value of quarter dollar, half dollar and one dollar. An operating lever 52 is pivotally secured to the base at 53 and has a box-like upper end that has been designated by reference numeral 54. This box-like portion covers the coin receiving openings when the lever is in the position shown in Figure 1. Secured to the lower end of lever 52 is a roller 55 that engages the roller 48 on the crank arm 47 in the manner shown in Figure 1.

A bell crank lever 56 is secured to the shaft 44 and the end of its downwardly projecting arm 57 is pivotally connected with a rod 58 whose other end is pivotally connected with the end of the downwardly projecting arm 59 of a bell crank pivoted at 60. The other arm 61 is pivotally connected with a piston rod 62 to the lower end of which piston 63 is attached. Piston 63 is positioned within a dashpot cylinder 64 and is provided with a check valve 65 that permits liquid to flow upwardly, but retards its flow downwardly. The check valve 65 is preferably provided with a slight leak so that liquid may flow downwardly but very slowly. A spring 66 is connected with the crank arm 61 and with a stationary anchor 67.

Let us now assume that the parts are assembled in the manner shown on Figure 1 and described above and that the operator grasps the upper end 54 of the operating lever 52 and turns the lever counterclockwise about pivot 53. Roller 55 will now move roller 48 inwardly thereby rotating shaft 44 in a clockwise direction through a certain angle. This rotary movement of shaft 44 causes the arm 57 to move the bar 58 towards the left, thereby rocking the bell crank lever in a clockwise direction about pivot 60 whereupon piston 63 is moved downwardly in the dashpot cylinder and spring 66 tensioned. Simultaneously with the movement of the dashpot piston and the tensioning of the spring, crank arm 43 moves the rod 41 downwardly and rotates lever 32 in a clockwise direction about pivot 33 whereupon the rod 31 rotates the rocking lever 24 clockwise about the axis of shaft 25 and causes the latter to turn, thereby raising the latching pawl 21 and also moving the upper end 30 of blocking lever 28 to the right as shown in Figure 1 When the latching pawl is moved out of engagement with the notch 20, the meter is unlocked and may rotate. The operator now inserts coins in one or more of the coin receiving openings and returns the operating lever 52 to the position shown in Figure 1, whereupon the spring 66 begins to function and returns the parts to the position shown in Figure 1. This return movement is retarded by the dashpot and if the coin passes the several tests, it will come into a position directly underneath the roller 29 before the blocking lever returns and this will stop further return movement of the blocking lever, whereupon the upward movement of rod 41 causes lever 32 to turn about its pivotal connection with rod 31, thereupon rotating the shaft 35 counterclockwise and closing the mercury switch 40 and this in turn starts the motor 8 and pump 6, thereby subjecting the meter to the action of liquid under pressure. If the valve in nozzle 14 is open, liquid will flow through the meter and through the nozzle.

In order to explain the complete operation of the mechanism, it will now be necessary to describe several of its elements and later to describe the cooperative relationship between these elements.

In the above description, a testing apparatus has been referred to. This apparatus is an adaptation of that described and claimed in applicant's Patent No. 2,148,291, granted on February 21, 1939, and differs from the apparatus there described in some particulars to which reference will be made. Owing to the fact that the principle upon which the testing apparatus operates is fully described and claimed in the patent above identified, no attempt will be made here to describe the operation with any greater particularity than necessary to explain its cooperative relation with the present invention.

Figure 3:
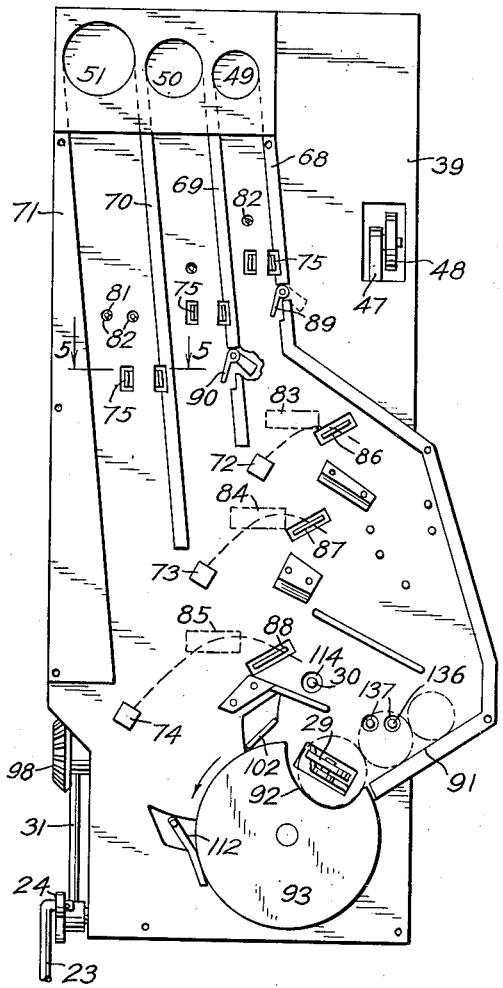
Figure 3 is a view similar to that shown in Figure 2, but with the cover plate and magnets removed.
Figure 4:
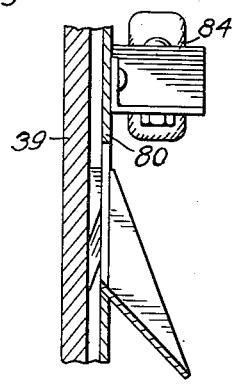
Figure 4 is a section taken on line 4—4, Figure 2.

Referring now more particularly to Figures 2, 3, 4 and 5, it will be seen, especially from Figure 3, that three passages extend downwardly from the coin receiving openings 49, 50 and 51. These passages are bounded by metal bars 68, 69, 70 and 71. It will be observed that these passages are inclined slightly to the right when viewed as in Figure 3. Positioned at the bottom of these passages are anvils 72, 73 and 74. These anvils are formed from steel and are provided with an upper surface inclined with respect to the paths of the several coins in such a way that when the coins strike them, they rebound along the paths shown by broken lines. Positioned some distance below the coin receiving openings are coin sizing mechanisms 75 that are shown more particularly in Figure 5, from which it will be seen that each consists of a lever pivoted at 76 to the outer movable end of a rocking lever 77. The coin testing lever has two arms 78 and 79 that extend through openings in the base plate 39 and towards the cover plate 80, which has been removed in Figure 3. The long arm 78 approaches the cover plate and the shorter arm 79 is of such length that it will engage and hold coins of the proper thickness. The distance between the edge of the bar 71 and the inner surface of arm 78 is slightly less than the diameter of the coin that is to be tested, and therefore a coin of smaller diameter will pass through. If the coin is of the proper diameter, but thinner than the regular coin, the holding arm will rock about its pivot and permit the coin to drop.

Positioned above the sizing mechanism are coin holders comprising spring holding fingers 81 that project through openings 82 in position to engage coins resting on the coins supported by the sizing mechanisms. Secured to the removable cover plate 80 are alternating current magnets 83, 84 and 85, whose positions have been indicated by broken lines in Figure 3. Inclined coin supports 86, 87 and 88 are positioned in the rebound path at the opposite sides of the magnets and serve as supports for the coins that pass through the magnetic flux, in a manner that will be hereinafter referred to. The coin passages are provided with pivotally mounted retarding members 89 and 90, which serve to retard any aluminum slugs that may be inserted and reduce their velocities to such an extent that they will be rejected by the testing mechanism in a manner shown and described in the patent above identified. From Figure 3, it will be seen that any coins that strike the anvils and pass through the magnetic flux will finally be deposited on an inclined support 91 that directs them into a coin receiving opening 92 in the periphery of the meter control disk 93.

The meter control mechanism which comprises the disk 93 shown in Figure 3, will now be described. Disk 93 is secured to a shaft 94 to the outer end of which a worm gear 95 is attached. This worm gear cooperates with a worm gear 96 of the same size, carried on shaft 97. The end of shaft 97 has a bevel gear pinion 98 that cooperates with another pinion 99 of the same size carried by shaft 18. It will now be apparent that whenever the meter shaft 15 rotates and turns shaft 18, disk 93 will also be rotated at a given ratio thereto. In the embodiment illustrated, the gear ratio between pinion 16 and gear 17 is 1 to 2, while the ratio between the bevel gears 98 and 99 and between the worm gears 95 and 96 are 1 to 1. It will therefore be evident that disk 93 will rotate once for every two revolutions of the meter shaft. This gear ratio may be changed to suit the convenience of the designer and is merely given for the purpose of illustration. When the meter is operating, disk 93 is rotating counterclockwise as indicated by the arrow in Figure 3.

Referring now to Figures 1 and 3, it will be seen that the roller 29 that is carried by the blocking lever 28 is so positioned that it will enter the coin receiving opening 92 if the latter is free from coin. If a coin is in position, the roller 29 engages it and it forms a stop which limits further rotary movement of shaft 25 and transfers the fulcrum of lever 32 from pivot 33 to its pivotal connnection with rod 31 and as a result of this, shaft 35 is rotated in a direction to close the switch 40 whenever a coin is so positioned that it stops the inward movement of the roller 29. As before explained, switch 40 controls the motor 8 and when the conditions just described prevail, this motor will start, thereby causing the pump 6 to function and deliver liquid to the meter. When the valve in the nozzle 14 is open, the meter is free to rotate and acts as an engine and drives the control disk 93 by means of the transmission mechanism already described. When the disk 93 begins to rotate, it carries the coin along. The coin receiving opening 92 is of such depth that a twenty-five cent piece will be tangent to the periphery of the disk when it is positioned in this opening. A fifty cent piece and a dollar will project beyond the periphery and in Figure 19 a coin has been shown by a full line, which is supposed to represent a dollar. Two progressively smaller circles in dot and dash lines represent respectively a fifty cent piece and a twenty-five cent piece. It will be seen that the peripheries of the dollar and the fifty cent piece extend beyond the periphery of the disk and form cam surfaces. A ratchet lever 100 is pivoted at 101 and has a projection 102 that engages the outer periphery of any coin positioned in the coin opening as the coin passes by. If the coin is a twenty-five cent piece, it does not move the ratchet lever, which is normally held in the position shown in Figure 16 by means of a spring 103. The end of ratchet lever 100 has a plurality of ratchet teeth 104 that cooperate with a pawl 105 that is attached to the escapement lever 106 by means of a pivot 107. The pivot 107 serves as a pivot both for the pawl 105 and for the escapement lever 106. The escapement lever has a tooth 108 positioned below the pivot and is provided with a stop 109 that limits the outward movement of the lower end 110 of pawl 105. A spring 111 serves to hold the pawl in engagement with the stop 109. When a fifty cent piece passes the projection 102, it moves the ratchet lever outwardly one ratchet tooth and when a dollar passes this point the ratchet lever is moved outwardly three ratchet teeth into the position shown in Figure 19. As soon as disk 93 has rotated sufficiently to move the coin out of engagement with the projection 102, and carried it past projection 112 of lever 106 blocking movement of lever 106 during the first revolution of disc 93, it is released and drops into a coin receiving receptacle. This projection 112 on the free end of the escapement lever 106 rests against the periphery of disk 93 when the coin opening 92 passes this projection during the second revolution of the disc. A spring 113 (Figure 2) moves the escapement lever into the opening, thereby moving the tooth 108 into engagement with one of the ratchet teeth and releasing the pawl 105, whereupon the ratchet lever moves inwardly one tooth each time the escapement lever returns to the position shown in Figure 16. Since a dollar moves the ratchet lever outwardly three teeth, disk 93 must rotate three times after the first 25-cent cycle in order to bring the ratchet lever back to the position shown in Figure 16.

Figure 19:
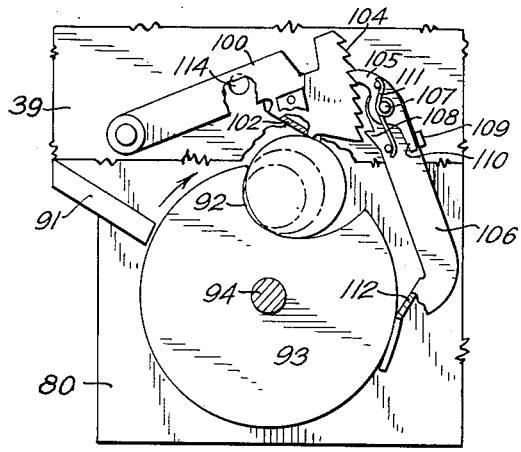
Figure 19 is a view similar to that shown in Figure 16, but with the cover plate and parts of the mechanism removed and shows the position of the ratchet mechanism when it is engaged by a silver dollar.

Referring now to Figure 19, a hole 114 is shown in the base plate 39. This hole is so positioned that when the projection 102 of the ratchet lever is in contact with the periphery of disk 93, it is entirely uncovered but if the ratchet lever is moved up one or more notches, it covers this hole and it then serves as a stop for projection 30 at the end of blocking lever 28. The blocking lever can therefore not return to meter locking position until the ratchet lever has returned to the position shown in Figures 1, 6 and 16, and the meter will therefore continue to operate until the ratchet lever has returned to normal position. When this occurs at a time when there is no coin in the coin opening 92, the blocking lever will move, in response to the action of spring 21a, until it reaches the position shown in Figure 18, whereupon the latching pawl 21 will be moved downwardly into position to engage in the notch 20 in the ratchet disk, thereby positively stopping the operation of the meter at a definite predetermined position. When latching pawl 21 moves to latching position, connecting rod 31 moves upwardly (see Figure 1) rotating lever 32 about its pivot point at the lower end of rod 41, which in turn rotates rocking lever 34 which moves switch 40 clockwise thus discontinuing operation of motor 8.

Shaft 97 is journaled in a bearing 115 adjacent one end of which a rocking arm 116 is rotatably mounted on the shaft. The end of the rocking arm is connected by means of a rod 117 with the outer end of the bell crank arm 118 and therefore oscillates whenever shaft 44 is oscillated by the action of the starting lever 52 and by the return movement of crank arm 47 effected by the action of spring 66.

Figure 20:
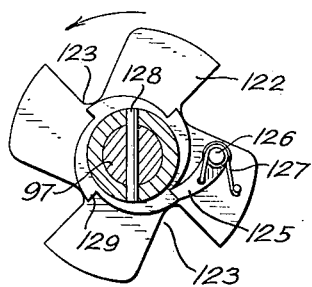
Figure 20 is a section taken on line 20—20, Figure 6.
Figure 21:
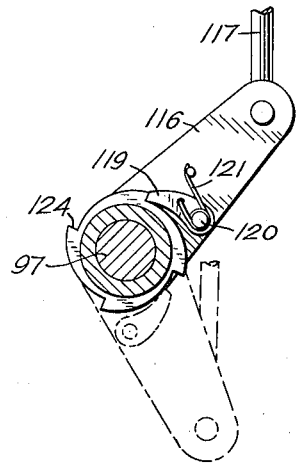
Figure 21 is a section taken on line 21—21, Figure 6.

Referring now more particularly to Figure 21, it will be observed that rocking arm 116 has a pawl 119 connected therewith by a pivot 120. A spring 121 serves to move or urge this pawl inwardly towards shaft 97. Rotatably secured to the shaft adjacent the rocking arm 116 is a cam member having four cam surfaces 122 as shown in Figure 20. These cam surfaces are separated by notches 123. The righthand side of the cam member is provided with a ratchet having four ratchet teeth 124 as shown in Figure 21, which is a section taken on line 21—21, Figure 6. This ratchet portion is integral with the cam and the latter is provided on the lefthand side, when viewed as in Figure 6, with a pawl 125 that is connected thereto by a pivot 126 and urged toward the shaft by means of the spring 127. Attached to the shaft 97 by means of a pin 128 is a ratchet member having four ratchet teeth 129. It will be observed from Figures 20 and 21 that the ratchet teeth 124 and 129 are reversely arranged so that the rocker arm 116 will rotate the cam in a counterclockwise direction when viewed as in Figure 20, and that the cam will be held against clockwise movement with relation to the shaft 97 by means of the pawl 125. When the shaft 97 rotates in a counterclockwise direction when viewed as in Figure 20, it will rotate the cam member by means of the pawl 125 and the ratchet teeth 129 and this rotation is not resisted by the pawl 119 because of its reverse arrangement.

Since there is a 1 to 1 ratio between shafts 94 and 97, the cam member having the teeth 122 will rotate once for each revolution of shaft 97.

Rod or shaft 130 is mounted for oscillation in bearings 131 and 132. The righthand end of this rod which has been designated by reference numeral 133 and which is clearly shown in Figure 1 is bent at right angles and has its end provided with a roller 134 which engages the peripherial surface of the cam member carried by shaft 97. The other end is also bent at right angles so as to provide an arm 135 that terminates in an inwardly extending end portion 136 that projects through one of the holes 137 in base plate 39. A crank arm 138 extends from the righthand end of shaft 130 substantially at right angles to the arm 133. A rod 139 has its lower end provided with an oblong opening through which a pivot 140 extends and connects it with the outer end of arm 138. Rod 139 extends upwardly and is connected by means of a pivot 141 with an arm or lever 142 that is mounted on a pivot 143 and biased in a clockwise direction by means of a spring 144 as shown in Figure 12. A spring 145 has one end connected with the arm 138 and the other connected to the base and serves to urge the roller 134 against the cam surfaces. A link 146 has one end connected with the pivot 141 and the other connected with a bail 147 carried by the shaft 148. The end of link 146 that is connected with the bail is provided with a member 149 that has two cam surfaces 150 and 151 the latter being nearer to the link than the former. Secured to the lever 142 are two clips that serve to support a mercury switch 153 (see Figures 6 and 7). These clips are so arranged that when the parts are in the position shown in Figure 12 the mercury closes the switch contacts, but when they are in the position shown in Figure 6, the switch is open. It will be observed that whenever the lever 142 is rocked about its pivot 143 the link 146 is reciprocated.

It will be apparent, especially from Figure 1, that if the cam is rotated a short distance in a counterclockwise direction, the roller 134 will drop from the cam surface 122 into the adjacent notch 123, being urged into this position by the action of spring 145. The inward movement of arm 133 produces a corresponding movement of arms 135 and 138, the latter causing the rod 139 to move upwardly thereby turning the lever arm 142 counterclockwise, thereby moving the mercury switch to the operative position shown in Figure 12 and at the same time moving the link 146 to the position shown in Figure 13. The parts are so arranged that the switch closes a short time before the finger 154 drops from the cam surface 150 onto the cam surface 151. The reason for this will appear as the description proceeds.

Referring again to Figure 1 and also to Figures 8, 9, 10 and 11, it will be seen that a shaft 155 is mounted for rotation in the bearing blocks 26 and 131. Extending from this shaft is an arm 156 whose end carries a roller 157 that is positioned so as to engage the cam surfaces 122 and to drop into the notches 123. A spring 158 has one end attached to the base at point 159 and the other to a short arm 160 that extends from the shaft 155 in the manner shown quite clearly in Figure 11. It will be observed that spring 158 exerts a force tending to move the roller 157 into engagement with the cam. Extending outwardly from shaft 155 is an arm 161 that has an opening for the reception of a pin in the lower end of the compression rod 162. The upper end of this rod is provided with a pin that extends through an opening in arm 163 that projects outwardly from shaft 148. A spring 164 shown in Figure 15 is connected with the shaft 148 in such a manner as to exert a force tending to turn it in a counterclockwise direction when viewed as in Figure 15. This spring exerts a continuous compression on rod 162 and therefore whenever the roller 157 moves from the position shown in Figure 8 to that shown in Figure 9 shaft 148 will be turned in a clockwise direction so as to move the holding fingers 81 from full line to dotted line position. Whenever the cam is rotated so as to permit roller 157 to drop from the cam surface 122 into the notch 123 or from the position shown in Figure 9 to that shown in Figure 8 the holding fingers will move from the dotted line to the full line position shown in Figure 15.

Figure 5:
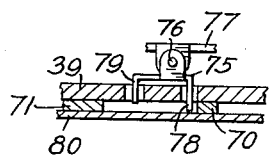
Figure 5 is a section taken on line 5—5, Figure 3 and shows one of the sizer elements.

The coin sizing mechanisms 75 that have been shown in Figure 5 and which have already been described, are attached to the arms 77 that project from the bar 165 which bar is provided at its opposite ends with trunnions 166 that are mounted in bearing brackets in the manner shown in Figure 6. A spring 167 (Figure 13) is connected with the bar 165 in such a way as to exert a force tending to raise the coin sizers and move them to coin releasing position. The force exerted by spring 167 is resisted by the finger 154 and the cam surfaces 150 and 151. When the link 146 is in the position shown in Figure 14 the coin sizer mechanism is in operative position and serves to hold coins of the proper size and thickness, but when the parts have moved to the position shown in Figure 13, the coil sizers move to inoperative position in response to the action of spring 167, thereby releasing any coins that are held by them.

In the present mechanism a plurality of coins may be deposited at once in any of the coin passages or slots and if more than one coin is deposited, it is, of course, necessary to make provision for holding all but those supported on the sizing mechanisms whenever these are moved to coin releasing position, because, if no such holding means were provided all of the coils would drop simultaneously and interfere with the testing operations. Each coin passage has therefore been provided with a holding mechanism comprising the spring fingers 81 that project from the shaft 148. These fingers are moved into and out of operative position by means of the arm 156, the compression rod 162 and the spring 164 shown in Figure 15. Whenever roller 157 is in engagement with one of the cam surfaces 122, the holding fingers 81 project through the opening in base 39 and into engagement with any coin positioned in the passage, between the base plate and the cover plate, as is clearly evident from an inspection of Figure 15. Before the coins are released by the sizing mechanisms, the holding fingers must be first moved into the coin engaging position.

It has already been explained how the coin sizing mechanisms are controlled by the roller 134 and the connecting rod 139. When the roller 134 is in the position shown in Figure 8 and rests on a cam surface 122, the link 146 carrying the cam surfaces 150 and 151 is in the position shown in Figure 14 with respect to the finger 154. Whenever the cam is rotated slightly from the position shown in Figure 8 so as to permit the roller 134 to drop into the depression 123, the link 146 will move from the position shown in Figure 14 to that shown in Figure 13, thereby permitting finger 154 to drop from the cam surface 150 to the cam surface 151 and thereby release the coin sizing mechanisms so as to permit the coins supported by them to drop onto the anvils. It will be observed from Figures 8 and 11 that when the parts are in normal position, roller 134 rests on a cam surface 122 while roller 157 is positioned in one of the notches 123. When the cam is rotated slightly in a clockwise direction, roller 157 will move up the inclined surface from the notch 123 to the cam surface 122, thereby moving the holding fingers 81 to holding or dotted line position, as shown in Figure 15. Immediately after this, the roller 134 will drop from the cam surface 122, into the notch and the parts will now be in the position shown in Figure 9. As soon as roller 134 drops into the notch, the coins are released by the sizing mechanisms and allowed to drop, but immediately before the coins are thus released, the mercury switch 153 is moved to closed position as shown in Figure 12, thereby energizing the electromagnets 83, 84 and 85 so as to produce an alternating magnetic flux in the rebound path of the coins. The timing between the closing of the switch and the releasing of the coins is controlled by the finger 154 and the cam surfaces 150 and 151 that are carried by the link 146.

The coin testing mechanism employed in this device requires the coins to be supported on an inclined support for a short time after they have passed through the alternating magnetic flux and these inclined supports have been shown in Figure 3 and designated by reference numerals 86, 87 and 88. From Figure 6 it will be seen that the inclined supports are attached to a rod 168 whose upper end is non-rotatably connected with a shaft 169 whose ends are journaled in bearings 170. A spring 171 surrounds the shaft and is so related to it and to bar 168 that it tends to move the latter upwardly when viewed as in Figure 6 or to the left when viewed as in Figures 8, 9 and 10. The lower end of bar 168 is bent laterally to provide a projection 172 that normally rests against the peripheral surface of the cam member. When the projection 172 rests on a cam surface 122 the inclined supports are in operative position. This position is shown in Figure 8. When the cam rotates so as to permit the projection 172 to drop into one of the notches 123 as shown in Figure 10 the inclined supports are moved outwardly into inoperative position, thereby releasing the coins which thereupon drop onto the inclined support 91, as shown in Figure 3, and the first coin rolls into the coin opening 92. At the instant that the projection 172 drops into one of the notches 123, shaft 169 turns slightly and the finger 173 engages the bar 165 as shown in Figure 14, and turns it about its pivots, thereby bringing the sizing mechanisms into operative position and immediately after this the roller 134 moves from a notch onto a cam surface 122, thereby moving the mercury switch to open position and moving the link 146 to the position shown in Figure 14 in which position the coin sizing mechanism is held in operative position ready for the reception of another coin. Immediately after the sizing devices have been moved to operative position, roller 157 moves outwardly from a cam surface 122 (Figure 10) into a notch 123 (Figure 8), thereby permitting the coin holding fingers 81 to move to inoperative position (full line position in Figure 15) and permit the coin or coins supported by them to drop onto the sizing device, thereby bringing the parts into position for again testing the coins so supported. As soon as the coin testing devices have been moved to operative position, the inclined coin supports are again returned to operative position as the cam moves from the position shown in Figure 10 to that shown in Figure 8, which is the normal position attained by the parts before each coin testing operation.

From Figures 8, 9 and 10, it will be seen that crank arm 34 is provided with a laterally extending hook 174, that engages with the bracket 37 and limits the upward movement of this crank arm to the position shown in Figures 7 to 10, but permits it to rotate in the oposite direction to the position shown in Figure 11.

Crank arm 43 is provided with a lateral extension 175 that serves as a stop for limiting the rotation of shaft 44 in a counterclockwise direction to the position shown in Figure 8.

It will now be apparent that operation of the machine is initiated by the action of spring 66, that is, after one or more coins have been inserted in the coin magazine, which comprises the three coin slots, spring 66 supplies the power to ratchet disc 122 around a portion of a revolution and thus operate the coin testing mechanism to effect release and testing of the lowermost coins in the respective slots, and of course, effecting release of latching pawl 20 and operation of pump motor switch 40, as previously explained. After this operation has been initiated, spring 66 becomes inoperative and subsequent release of coins and testing thereof is derived from power supplied to disc 122 from the meter which drives it. It is apparent, therefore, that if several coins be inserted in one or more of the coin slots and handle 54 returned to the position shown in Figure 1, operation will be initiated and continue automatically without interruption until the machine has delivered a number of units of gasoline corresponding to the number of units represented by the value of all of the coins inserted.

In the drawing the base or plate 39 has been shown as though it were positioned in a vertical plane. This is due to the fact that it facilitated the drawing, but in the actual machine, plate 39 is inclined with the surface shown in Figure 6 at the top, the inclination of which is somewhere between 20 and 30 degrees. By inclining the plate, the coins will always be in contact with the supporting surface when dropping through the coin passages and in this way flutter is prevented. The inclination of plate 39 also serves to slow up the descent of coins if wetted, as they sometimes are when slugs are employed. It also prevents accidental operation of the machine by slugs and badly worn coins.

Attention has already been called to the fact that the unit of liquid or gasoline dispensed has a value of twenty-five cents and the meter must be so adjusted that each cycle will dispense this quantity of gasoline. In the embodiment illustrated, the ratchet disk 19 has a single notch 20 and since the gear ratio between shafts 15 and 18 is as 1 to 2, the meter will make two complete revolutions for each unit of gasoline dispensed.

Figure 23:
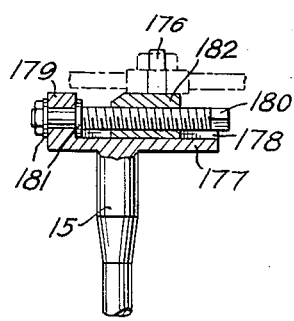
Figure 23 is a top plan view of the adjustable crank pin employed in connection with the meter.
Figure 24:
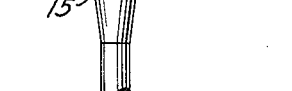
Figure 24 is a section taken on line 24—24, Figure 23.

It is evident that the capacity of the meter per cycle must be adjusted to conform to the selling price of the gasoline and for this purpose the distance that the pistons reciprocate must be adjusted to vary the capacity per stroke. The meter has the general appearance and construction of ordinary meters of this kind and is provided with four cylinders, each of which has a piston. The pistons are all connected by means of suitable rods with a common crank pin 176 shown in Figures 23 and 24. In Figure 24 the connecting rods have been indicated by dot and dash lines. The meter shaft 15 is provided within the crank case with a transversely extending head 177 that has a longitudinally extending dovetail slot 178 that is open at one end and closed at the other end by a wall 179. A screw 180 is rotatably connected with the end wall 179 and held against longitudinal movement by means of shoulders 181, as shown in Figure 24. The crank pin is fastened to a slide block 182 that has a threaded connection with the screw 180. By rotating the screw 180, the slide block 182 with its crank pin 176 can be moved so as to adjust the throw of the crank pin.

Figure 22:
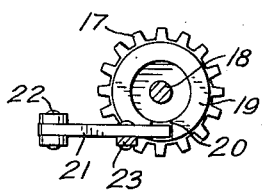
Figure 22 is a section taken on line 22—22, Figure 1.

Attention is now called to Figures 1 and 22 from which it will be seen that the ratchet disk 19 has a single notch 20 with which the pawl 21 engages at the end of each cycle of operation, or at the end of a plurality of cycles, depending upon the value of gasoline dispensed. It will be seen that the pawl forms a positive stop for the gear 17 and also for the meter and the latter therefore stops at the same place at the end of each operating cycle. By referring to Figure 1, it will be seen that a wrench has been provided which has a socket 183 positioned to engage the outer end of screw 180. The shank 184 extends through the crank case wall so as to be accessible from the outside. When the meter is to be adjusted for price changes, the socket is applied to the end of the screw and the latter rotated so as to adjust the capacity of the meter to the selling price. In actual operation the wrench 184 is provided with a pointer that moves over a scale graduated to different prices per gallon and the capacity of the meter can therefore be readily adjusted to suit any retail price.

Referring again to Figures 6 and 7, attention is called to the spring 38 which serves to hold the link 32 in the position shown in Figure 7 as long as the blocking lever 28 permits shaft 25 to rotate in response to the action of spring 66. During this time, lever 32 turns about pivot 33. When the roller 29 engages a coin, it stops further rotation of shaft 25 and link 32 then begins to turn about the pivot formed by the upper end of rod 31, whereupon shaft 35 is rotated and moves the switch 40 to circuit closing position.

In Figure 1 the dashpot and the means connecting the same with shaft 44 have been shown in a slightly different manner than in Figures 6 and 7, but it should be borne in mind that Figure 1 is merely a diagrammatic representation and that the two structures are equivalents for the purposes under consideration.

Referring now more particularly to Figures 1 and 16, it will be noticed that a shaft 185 is mounted for oscillatory movements in bearing blocks 186. This shaft has its lefthand end, number 187, bent at right angles to the shaft and this bent portion terminates in an inwardly extending part 188, better shown in Figure 17, and which is adapted to enter one of the holes 137. Shaft 185 is also provided with a laterally extending arm 189 and with a projection 190 to which one end of spring 103 is anchored. The ratchet lever 100 has secured to it a downwardly extending plate 191 that normally projects between the plate 39 and the lateral projection 189 in the manner shown in Figure 17. When the parts are in the position shown in Figures 16 and 17, the end 188 of part 187 is held in the position shown in Figure 17 and does therefore not project through the plate 39. When a half dollar or one dollar coin is in position in the coin receiving opening 92, it moves the ratchet lever upwardly either one or three notches as above explained. When the lever moves upwardly one or more notches, the part 191 is withdrawn from beneath the lateral projection 189 and spring 103 then functions to move the end portion 188 inwardly into engagement with any coin that may be positioned beneath the hole 137. The mechanism just described assures that coils will not be fed into the coin opening 92 until the ratches lever 100 has returned to the position shown in Figures 16 and 17. The arm 135 when moved in response to the action of spring 145 will engage any coin positioned underneath the hole 137 and prevents the machine from feeding and testing coins so long as there is a coin in position to enter the opening 92 in the meter controlled disk.

Some of the advantages of having the mechanism inclined have been mentioned above, but an additional advantage is that by having the plate 39 inclined, the air gap always remains the same, regardless of whether the coins are worn or not and this is an important consideration in obtaining free operation. The spring shown in Figure 2 and designated by reference numeral 113 is attached to the escapement lever 106 and serves to urge it against the periphery of the meter controlled disk and into the opening 92 when the same passes the end of this lever.

Coin operation

When the apparatus shown on the drawing and described herein is to be operated, lever 52 is first turned outwardly through an angle of approximately ninety degrees, whereupon shaft 44 is turned clockwise in Figure 1. This rotation of shaft 44 tensions spring 66, moves piston 63 downwardly in the dashpot cylinder, turns lever 24 and shaft 25 clockwise, thereby raising the latching pawl 21 and the blocking lever 28. Arm 116 is also moved from full line to dotted line position, shown in Figure 21, thereby bringing pawl 119 into position to engage another ratchet tooth 124. One or more coins may now be inserted through openings 49, 50 and 51. When the operating lever is in the projecting position, box-like portion 54 serves to catch any coins that may be accidentally dropped. After the coins have been inserted, the operating lever is returned to the position shown in Figure 1, whereupon shaft 44 begins to turn in a counterclockwise direction, due to the action of the spring 66. This return movement is controlled as to speed by the dashpot. The position of the parts when the operating lever is in its outward position is shown in Figure 8 and the corresponding position of arm 116 is shown by broken lines in Figure 21. The coin sizers 75 are held in operative position until after cam 122 begins to turn and therefore the coins that are inserted through the openings rest on the sizing devices. During the return movement of shaft 44, the arm 116 moves from the broken line position shown in Figure 21 towards the full line position and as soon as the pawl 119 engages the tooth 124, it begins to turn the cam. As soon as cam 122 begins to turn, roller 157 moves from the position shown in Figure 8 towards that shown in Figure 9 whereupon fingers 81 are brought into engagement with any coins that rest on those that are supported by the sizing device and therefore, when the sizing devices are moved to inoperative position, only those coins that are supported by them are released. Immediately after the holding fingers are brought into operative position, roller 134 drops into a notch 123, whereupon rod 139 is moved upwardly, whereupon switch 153 is tilted so as to close the circuit to the magnets, after which link 146 is moved from the position shown in Figure 14 to that shown in Figure 13, whereupon the sizing devices release the coins and let them fall upon their anvils and rebound into and through the alternating magnetic flux. End 172 of bar 168 remains in engagement with a cam surface 122 and holds the inclined supports in position until some time after the testing operation is completed but reaches the position shown in Figure 10 just before the magnets are deenergized. When the coins are released from the inclined supports, they drop onto the inclined support 91 and the first one rolls into opening 92. When the blocking lever returns, roller 29 engages the coin in opening 92 whereupon shaft 35 begins to turn and closes switch 40, thereby starting the motor and pump. As soon as the pump starts operating the meter is subjected to the action of liquid under pressure but will not turn until the valve in the dispensing nozzle is opened and in the meantime the liquid is circulated through the by-pass valve 9.

As soon as the valve in the dispensing nozzle is opened, the meter starts operating and turns ratchet disk 19 and the control disc 93, which carries a coin in opening 92. If the coin is a twenty-five cent piece, it will not move the ratchet lever 100 and will remain in the opening until after it has passed the inward projection 112 of the escapement lever 106. During the rotation of disk 93 roller 29 rides on the surface of the disk. As soon as opening 92 returns to the starting position, roller 29 drops into it unless another tested coin is in position to take the place of the first one whereupon the latching pawl moves downwardly into engagement with the ratchet disk 19 and into the notch 20, thereby stopping the meter. At the same time, switch 40 moves to open position. The parts are now in the position shown in Figures 7 and 8 and ready for another operative cycle.

If a half dollar is positioned in opening 92, it will move ratchet lever 100 upwardly one ratchet tooth as it passes beneath the part 102. As soon as lever 100 is moved upwardly, it covers the hole 114 and prevents pin 30 from entering until the ratchet lever has returned to normal position. Since the coin does not leave opening 92 until after it has passed the projection 112 on the escapement lever, the latter will not release the ratchet lever and therefore pin 30 will not enter the hole 114 until after the opening 92 has again passed the projection 112. Since opening 92 has no coin in it the second time it passes projection 112, the latter will be pulled into the opening by the action of the spring and when it is returned it will permit the ratchet lever to move inwardly one notch, thereupon returning it to its normal or original position.

If a dollar is positioned in the opening 92, it will move the ratchet lever upwardly three notches and it will therefore require four complete turns of disk 93 to bring the ratchet lever back to normal position.

Since the parts are so adjusted that twenty-five cents worth of gasoline is dispensed at each revolution of the ratchet disk 19 and of the control disk 93, it is apparent that a half dollar will dispense twice as much gasoline as a quarter of a dollar and that a dollar will dispense four times as much.

*Quantity registering mechanism*

With either automatic coin control operation or with the manual control, which will presently be described, it is desirable to provide registering mechanism which indicates to the customer the quantity of gasoline purchased for any given number of units of gasoline delivered by the pump. Thus, if the price of gasoline were 19.5 cents per gallon and the customer had inserted one dollar in the machine he would desire to know whether he had received the 5.13 gallons to which he was entitled. Further, since many motorists can better determine how many gallons are required to fill a tank from certain gasoline gage readings on the instrument panel of the automobile, this affords them a better measure to determine how many additional units of gasoline they might need. In the example just given, the motorist, after having purchased one dollar's worth and knowing that his tank would hold an additional five gallons would know that he could safely purchase another dollar's worth without running the tank over. The construction by which the number of quarter dollar units are translated into quantity, such as gallons, will now be described.

Referring to Figure 1, shaft 18 extends upwardly, or is otherwise operatively connected, to a suitable dial 210 which is disposed in a convenient position on the pump unit, the pointers or hands 211, 212, registering quantity, for example gallons and one tenth gallons, respectively.

Referring to Figures 25 to 30, shaft 18 has affixed thereto a disk 213 which drives through frictional contact a disk 214, disk 213 being adjustable along shaft 18 and secured thereto at a desired position such as by set screw 215, any suitable means such as spring 216, being employed to maintain frictional, non-slip, engagement between the disks. Disk 214 is affixed to a shaft 217, journaled in bearings 218, 219, on plate 220, this shaft having affixed thereto gears 221, 222. Gear 222 meshes with a gear 223 journaled in bearing 224, also mounted on plate 220, by a stub end 225. Gear 226, having an integral sleeve 227 is journaled in bearing 228, this gear meshing with gear 221. A disk 229 is affixed to a sleeve 230 the latter being journaled in bearing 231, this disk having a weight 232 on one side thereof. A shaft 233 has one end journaled in stub end 225 and also in sleeves 227 and 230, this shaft having a similar weighted disk 234 affixed thereto which is engageable with a disk 235 affixed to gear 223. Sleeve 227 has a groove 236, and a sleeve 237 affixed to disk 234 has a similar groove 238 therein. Sleeve 230 and shaft 233 have affixed thereto, respectively, hands 212 and 211.

The actuators for the disk arrangements 234, 235, and 226, 229, which form clutches, comprise a pair of arms 239, 240 which pivot on a shaft 241 and are urged away from each other, as shown in Figure 28, by a spring 242, these arms having pins 243, 244 which engage in grooves 238 and 236, respectively.

The clutches are controlled by a shaft 245, having ears 246 which engage the ends of arms 239, 240 (see Figure 28), shaft 245 (see Figure 30) having a hook 247 affixed thereto which supports the dispensing nozzle 14, when the pump is not in use, the weight of the nozzle and hose 13 being sufficient to rotate shaft 245 clockwise and disengage the clutches. When in disengaged position gear 226 is shifted to the right, away from disk 229, and disk 234 is shifted to the left away from disk 235. In this position both hands 211, 212 will be vertical at the 0—0 position.

When a customer desires to operate the pump, as previously described, the nozzle is removed from hook 246 which engages the two clutches with the handles 211, 212. As the pump operates, disk 18 drives the quantity registering mechanism, it being understood that if the hands indicate gallons and tenths of gallons, the gearing will be such that hand 211 makes a full revolution for a tenth of a revolution of hand 212. When dispensing is completed the customer may observe the quantity of gasoline delivered, as in gallons, on dial 210. When the hose nozzle is replaced on the hook, the two clutches are disengaged and the weights 232 return the hands to 0—0 position. If desired, a fixed permanent magnet 250 may be employed to cooperate with a magnetic portion 251 on each weighted disk to bring the hands to exactly 0—0 position and thus obviate any misalignment of the hands due to friction in the hand operating mechanism.

*Manual operation*

The construction so far described is for automatic dispensing in response to coins inserted in the machine. In some instances, it is desirable to have manual control over the pump as well as coin operated control. For example, a gasoline station attendant may desire, during the daytime, to dispense a predetermined amount of gasoline to a customer, receiving payment therefor in the conventional manner, and during the night time, resume coin operated control, so customers may obtain gasoline during the attendant's absence. The construction by which this is attained will now be described.

Referring to Figures 31 and 32 ratchet lever 100, previously described, is normally inaccessible. To render this lever accessible a suitable hinged door 200 is provided on the casing which houses the pump mechanism, this door being locked by a lock 201 when the machine is to be under coin control. A control lever 202 overlaps lever 100 (omitted in Figures 6, 16, and 19, in the interests of clarity), which may form an extension of lever 100 when the door 200 is opened. Any suitable telescopic connection such as the slotted arrangement 203 may be employed and a spring detent 204 may be employed to hold the extension in the position shown in Figure 31. When it is desired to employ manual operation door 200 is unlocked and swung to the position shown in Figure 31, after which, the operator withdraws extension 202 by pulling on knob 205. The end of the extension is provided with a pointer 206 which overlays a suitable dial 207, as shown. This dial is graduated in units, each of which represents one-quarter of a dollar. It is apparent, however, that the dial may be graduated in units such as $.25, $.50, $.75, $1.00, etc.

In the manual operation, after the pointer 206 has been positioned as just described, the operator grasps the upper end 54 of operating lever 52 and turns the lever counter-clockwise (Figure 1). This actuates all of the parts exactly the same as previously described. While piston 63 in the dashpot 64 is returning to its upper position, the operator sets the pointer to the desired number of units of gasoline. This, as before described, places ratchet lever 100 in the path of portion 30 on blocking lever 28. As the dashpot piston returns to its upper position, movement of the blocking lever, to its normal inoperative position, will be prevented by ratchet lever 100. Since further movement of rocking lever 24 is now precluded, further movement of the dashpot piston rocks the left end of floating lever 32 counterclockwise which actuates switch 40, thus starting the pump motor 8. Each revolution of disk 93 jacks the ratchet lever down one notch and when the end 30 of blocking lever 28 is again free to pass to the left of ratchet lever 100 spring 21a moves it to such position which draws latch 21 downwardly to stop the meter, the left end of rocking lever 32 being rotated clockwise to thus discontinue operation of motor 8.

What is claimed as new is:

1. In a prepayment liquid dispensing apparatus, a pressure operated meter adapted to deliver a predetermined quantity of liquid during a complete predetermined cycle of operation thereof, control mechanism connected mechanically to said meter and driven thereby, comprising a single substantially circular disk mounted for rotation about its center and provided with a peripheral notch of a depth equal to the diameter of a twenty-five cent piece and large enough to receive separately a fifty cent piece and a silver dollar, means responsive to the control mechanism for continuously operating the meter through the number of complete cycles corresponding to the value of the coin in the notch, a positive latching means comprising a rotatable member mechanically coupled with the meter movable one complete revolution for each complete cycle of the meter, and a pawl movably connected with a member stationary with respect to the rotatable member, said last named member having a notch positioned to receive said pawl, means comprising a spring for urging the pawl into engagement with the rotatable member and into the notch to effect a positive stopping of the meter, manual means for moving the pawl to inoperative position, means controlled by a silver quarter positioned in the notch of said rotatable disk for retaining the pawl in its inoperative position during one complete cycle of the meter, said means comprising a rotatable bar having one end provided with a crank arm and a link connected with the pawl, the other end having a crank arm resting on the notched disk and urged against the latter for releasing the pawl when the notch passes a certain point without a coin therein.

2. Apparatus in accordance with claim 1 including means for adjusting the quantity of liquid delivered by the meter in each of said predetermined cycles of its operation.

3. Apparatus in accordance with claim 1 including manual control means operatively connected to said mechanism and adapted to be preset to effect operation of said mechanism, normally effected by the coin or coins, whereby the apparatus may operate through its predetermined cycles under either coin control or manual control.

4. Apparatus in accordance with claim 1 including a magazine adapted to receive and hold coins, and means comprising an arm pivoted at one end and provided intermediate its ends with means positioned and arranged to engage and hold the first coin in the magazine, a notched cam in operative engagement with the free end of said arm to hold it in coin holding position, spring means in operative engagement with said arm urging it toward coin releasing position, manually operable means in operative engagement with said cam to move it to effect a release of said first coin for delivery to said control mechanism in a manner to effect continuous operation of said meter until all coins in said magazine have effected operation of said meter through a number of cycles of operation corresponding to the number of units of value represented by said coins.

5. A coin operated meter control device comprising in combination, a pressure operated meter having a drive shaft, a single circular meter control disk mounted for rotation about its center, means comprising a gear train rotating the control disk from the meter shaft at a fixed ratio, said disk having at least one peripheral opening for the reception of a coin, means engagable with a coin positioned in the opening in the control disk and responsive to a manually operated lever, for supplying liquid under pressure to the meter, and means comprising the meter control disk and a member controlled by said disk for effecting a latching of the meter and discontinuing the supply of pressure liquid to the meter at the end of a predetermined rotary cycle of the meter.

6. A prepayment coin controlled liquid dispensing apparatus comprising a pressure operated meter having drive shaft, a source of liquid under pressure in operative engagement with the meter, a latch mechanism comprising a pawl operatively associated with the meter for holding it from movement, manually controlled means operatively connected with said latch mechanism for releasing the same, a meter control disk mounted for rotation, means comprising a gear train, for rotating the control disk from the shaft of the meter at a given speed ratio, said disk having at least one peripheral notch for the reception of coins of different diameters, means comprising an electric motor, a pump, and a switch for controlling the flow of said liquid under pressure to the meter thereby starting it to operate, and means comprising said control disk and a mechanism engagable by a coin positioned in the peripheral notch thereof to maintain the latch mechanism in released position and reset it after a predetermined number of cycles of the meter as determined by the size of the coin in the control disk.

7. A liquid dispensing apparatus having a pressure operated meter provided with a drive shaft, a dispensing conduit connected therewith, and a valve for controlling the flow of liquid from the conduit; a latch mechanism associated with the meter shaft for preventing rotation thereof, a single control disk mounted for rotation, said disk having at least one peripheral notch for the reception of one coin at a time, the radial depth of the notch being equal to the diameter of a twenty-five cent piece and large enough to receive a half dollar coin and a silver dollar, means for rotating the control disk by power derived from the meter shaft and at a fixed ratio thereto, means for directing coins into the notch in the control disk, means comprising a manually operable lever for releasing the meter latch, and means comprising a pivotally mounted ratchet member having a portion normally resting on the periphery of the control disk, responsive to the size of the coin and an escapement device having a portion thereof normally resting on the periphery of the control disk for moving the meter latching device to operative position after a predetermined rotary movement of the meter shaft, whereby the quantity of liquid dispensed will correspond to the size and value of the coin.

8. In a prepayment liquid dispensing apparatus having a pressure operated meter provided with a drive shaft; a latch mechanism associated with the meter shaft for preventing rotation thereof, a meter control disk mounted for rotation, said disk having a peripheral notch for the reception of a coin, means for rotating the control disk by power derived from the meter shaft and at a fixed ratio thereto, means for directing coins into the notch in the control disk, means for releasing the meter latch, and means responsive to the size of the coin for moving the latching device to operative position after a predetermined rotary movement of the meter shaft, whereby the quantity of liquid dispensed will correspond to the size and value of the coin, said last named means comprising a pivotally mounted ratchet lever having a portion thereof positioned in the plane of the control disk for engagement by half dollar and dollar coins which cooperate with the control disk to form a cam, and an escapement element associated with the ratchet member, said escapement element having a portion movable into the coin receiving notch in the control disk when the latter is empty whereby the ratchet member will be returned one notch each time the escapement element enters the opening.

9. In a prepayment liquid dispensing apparatus having a pressure operated meter provided with a drive shaft; a latch mechanism operatively associated with the meter shaft for stopping it in a predetermined rotary position and for holding it against movement, a meter control disk, means operated by the rotation of the meter shaft for rotating the control disk at a fixed ratio thereto, the control disk having a peripheral coin receiving notch, manually operable means for moving the latch mechanism to inoperative position, a mechanism for handling coins of different diameters and passing them into the notch in the disk, means comprising a pivoted lever responsive to the presence of a coin in said notch, for directing liquid under pressure into the meter, whereby the latter can operate to measure and dispense liquid, and means responsive to the diameter of the coin in the rotating disk for determining the quantity of liquid dispensed by the meter, for moving the latch to operative position, and for discontinuing the liquid pressure on the meter.

10. In an apparatus having a pressure operated meter, a mechanism positioned to receive coins and for controlling the operation of the meter in accordance with the diameter of the coins, comprising, in combination, a drive shaft rotated by the meter, a ratchet disk rotated by the shaft at a predetermined ratio thereto, a latching pawl pivoted to a stationary part and positioned to engage said ratchet disk and stop the meter at the end of a completed cycle, a meter control disk also rotated by the shaft at a predetermined ratio, the last named disk having a peripheral notch for receiving silver coins having values of twenty-five cents, fifty cents and one dollar, the notch being of such depth that a quarter positioned therein will be tangent to the inside of the periphery of the disk, a ratchet lever positioned with a portion thereof adjacent the peripherial edge of the meter control disk in position to be engaged by a coin positioned in the notch whereby half dollar and dollar coins which project beyond the periphery will move the ratchet lever outwardly one ratchet tooth when engaged by the edge of a fifty cent coin and three teeth when engaged by the edge of a silver dollar, an escapement mechanism for returning the ratchet lever one tooth for each complete cycle of the control disk after the first, an electric motor driven pump operatively associated with the meter for delivering liquid under pressure thereto, a motor circuit, a normally open control switch in said circuit, a manually operated starting lever and a blocking lever operatively associated with each other and with the control switch for closing said switch to operate the pump and direct liquid under pressure into the meter when a coin is positioned in the notch in the control disk, whereby the meter can operate to deliver and measure liquid, said escapement operated ratchet member and the blocking lever serving to open said circuit and discontinue the liquid supply to the meter when the ratchet lever has returned to normal position and the opening in the disk arrives at a predetermined position, free from coin.

11. A meter control apparatus for use in a predetermined quantity liquid dispensing apparatus, comprising in combination, a base, a meter control disk mounted thereon for rotation, the disk having a peripheral notch for the reception of coins of the size of quarters, half dollars and dollars, means comprising a pressure operated meter for rotating the disk, the base having a passageway for directing coins into the notch in the disk, a ratchet movably connected with the base, a portion of said ratchet normally resting against the periphery of the disk, the notch in the disk being of such depth that a quarter will be tangent to the inside of the circle defining the periphery of the disk, the ratchet member having a plurality of teeth, an escapement lever pivoted to the base, a spring means for urging the ratchet member and the escapement lever toward the periphery of the control disk, whereby the ratchet member will be moved outwardly by half dollar and dollar coins and latched by the escapement lever, the latter moving the ratchet member one notch each time it enters the notch in the rotating disk, a blocking lever forming a portion of a means for controlling the meter, the ratchet member serving as a stop means for the blocking lever when it is moved outwardly by a half dollar or a dollar, and means for engaging and holding a coin from movement into the notch in the disk while the ratchet member is out of normal position.

References Cited in the file of this patent
UNITED STATES PATENTS

| | | |
|---|---|---|
| 1,270,002 | Bowser | June 18, 1918 |
| 1,732,063 | Porte | Oct. 15, 1929 |
| 1,849,387 | Talbot | Mar. 15, 1932 |
| 1,921,775 | Pike | Aug. 8, 1933 |
| 2,209,703 | Mettler | July 30, 1940 |
| 2,223,146 | Yeomans | Nov. 26, 1940 |
| 2,259,587 | Rush | Oct. 21, 1941 |
| 2,287,363 | Weston | June 23, 1942 |
| 2,366,469 | Andres | Jan. 2, 1945 |
| 2,384,585 | Alexander | Sept. 11, 1945 |
| 2,451,776 | Rush | Oct. 19, 1948 |
| 2,573,112 | Schneckenburger | Oct. 30, 1951 |